Figure 1:
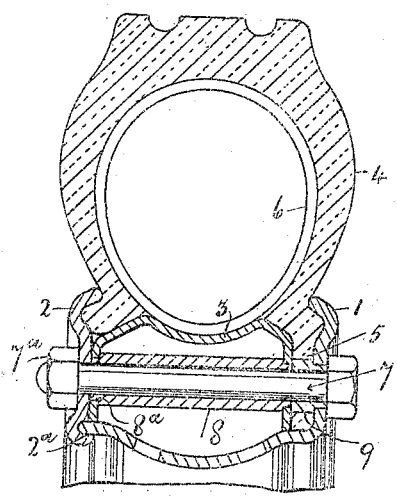

F. J. HADFIELD.
WHEEL.
APPLICATION FILED JAN. 8, 1914.

1,097,427.

Patented May 19, 1914.

Witnesses.

Inventor.
Frederick J. Hadfield
By Jno. N. Moore
Atty.

UNITED STATES PATENT OFFICE.

FREDERICK JOSEPH HADFIELD, OF RINGSFIELD, BECCLES, ENGLAND.

WHEEL.

1,097,427.

Specification of Letters Patent.

Patented May 19, 1914.

Application filed January 8, 1914. Serial No. 810,958.

*To all whom it may concern:*

Be it known that I, FREDERICK JOSEPH HADFIELD, a subject of the King of Great Britain, residing at Manor House, Ringsfield, Beccles, in the county of Suffolk, England, engineer, have invented certain new and useful Improvements in Wheels, of which improvements the following is a specification, reference being had therein to the accompanying drawing.

This invention relates to improvements in adjustable rims for the wheels of motor cars and other road vehicles, and to pneumatic tires and tire covers for use therewith of that type in which the tire cover is clamped between the rim flanges and a removable inner band or hoop by transverse bolts and nuts; and has for its object to greatly facilitate the removal, replacement and fixing of such tires, tire covers and inner tubes both as a whole and separately while considerably augmenting the strength and efficiency of the rims and tires or tire covers and inner tubes as a whole.

According to my invention the adjustable wheel rim is formed of a double box girder section which is transversely stayed and comprises an outer rim having a detachable side, and a loose inner supporting ring both of which are of a channel cross-section, while the tire or tire cover for use therewith is formed with a flange or flanges of rubber and fabric, or the like, on one, or on both sides, so that the same can be clamped between one or both sides of the outer rim and the inner ring by means of transverse bolts and nuts, the bolts passing through the sides of the outer rim and of the inner ring and also through suitable sleeves or distance pieces which are arranged between such sides so as to stay the same. The outer sleeves or distance pieces pass through holes or slots formed in the rubber and fabric flanges where required. The edges of the removable inner ring rest upon the bottom of the outer rim, while such inner ring is shaped and dimensioned so as to form a seating for the tire and the inner tube, and likewise to leave a space on one or both sides for the compressible flange or flanges of the tire to pass between such ring and one or both sides of the outer rim. The detachable side of the outer rim is grooved so as to clip the bottom of such rim and is secured by the transverse bolts and nuts which likewise serve as additional fastenings to secure the tire to the rim and so dispense with the ordinary security bolts. The tire or tire cover is beaded in the ordinary manner so as to engage with the usual grooves or recesses in the outer rim, while the inflating tube, which may be made rather longer than usual, passes through apertures of the usual shape formed for the purpose in the inner ring and outer rim.

Figure 2:
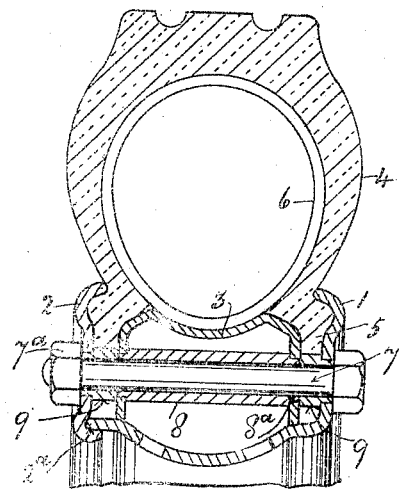
Figure 3:
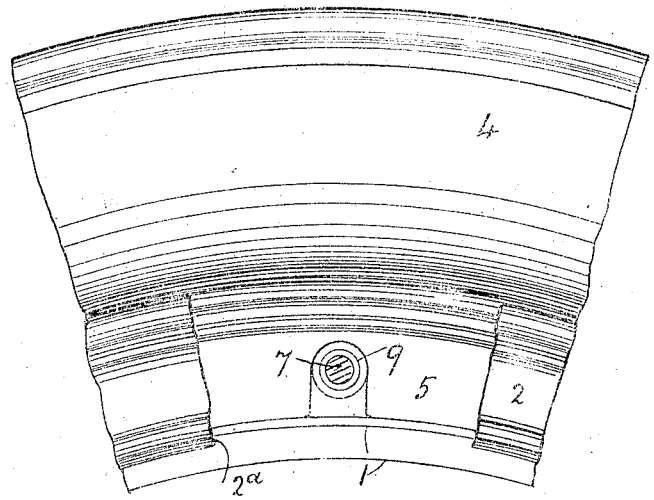

My invention is further described with the aid of the accompanying drawings. Figures 1, and 2, being transverse sectional views illustrating alternative constructions of my improved rim and tire as applied to a wire wheel; while Fig. 3 is a side view of the same with parts broken away.

Similar reference numerals indicate corresponding parts.

1, is the outer rim having a detachable side, 2, and 3, the loose inner supporting ring, which outer rim and inner ring are both of a channel section,—4, is the tire or tire cover having a flange 5, of rubber and fabric, on one or on each side,—6, is the inner tube of the tire, the usual inflating tube and valve not being shown.

7, indicates the transverse bolts, which are furnished with nuts, $7^a$, for clamping the several members of the rim and the tire firmly together; while 8, and 9, are transverse sleeves for staying the rim through which sleeves the bolts 7, pass. The inner ring 3, is made narrower than the outer rim, 1, so that when placed in position on the latter sufficient space is left on one or on both sides of such ring for, the reception of the flange or flanges 5, of the tire or tire cover. The edges of the inner ring rest on the bottom of the outer rim as shown, while such ring is shaped so as to afford a seating for the tire or tire cover, 4, and for the inner tube 6. The inflating tube is made long enough to pass through the apertures formed in the inner ring and outer rim and to take the usual valve and cap. The transverse bolts 7, pass through perforations formed in the outer rim and inner ring and are stayed by the sleeves 8 and 9, the sleeves 8, being sprung between the cheeks of the inner ring and retained in position by shoulders $8^a$, formed on such sleeves which shoulders engage with perforations in such cheeks; while the sleeves 9, are arranged between the sides of the outer rim and the inner ring as shown, and pass through suitable slots or holes formed in the flanges 5, of the tire or tire cover for the passage of the sleeves and bolts.

If preferred the sleeves 9 fitted at the back of the rim may be recessed into or brazed to the same and the front ones may be in like manner secured to the detachable side 2, which is formed with a groove 2ᵃ, so as to clip the bottom of the rim as shown, while such loose side also engages with the ordinary beading on one side of the tire, and is firmly secured and stayed transversely by means of the transverse bolts and sleeves.

In the construction shown in Fig. 1, the tire or tire cover 4, is furnished with a flange 5 on one side only, such flange being formed of rubber and fabric while the inner ring 3, is made of such a width as to leave a space between one side only of the outer rim and the inner ring, the detachable side 2, of the outer rim being clamped directly against the adjacent cheek of such inner ring, by the transverse bolts and nuts 7, 7ᵃ. In Fig. 2, the tire or tire cover is shown provided with a flange 5, on each side, a narrower ring 3, being employed in the rim so that such flanges can be clamped between both sides of the rim and the cheeks of the inner ring. In both arrangements the rim and tire are firmly secured and stayed by tightening up the nuts 7ᵃ which compress the flanges 5 of the tire 4 between the sides of the outer rim and inner ring until the thrust is taken by the sleeves 9, and then inflating the air tube the nuts being locked in position in any preferred manner. In the double flange arrangement the tire may be firmly secured without inflating the air tube.

What I claim is:—

In combination with a tire, a ring having a concaved portion to form a seat for the tire and provided with a pair of flanges, a rim having a rigid side formed with a tire engaging portion, a removable side engaging the rim and formed with a tire engaging portion, and means for clamping the ring and rim upon the tire, said means consisting of sleeves passing transversely through the ring and sides of the rim, and a clamping bolt mounted in said sleeves.

In testimony whereof I affix my signature in presence of two witnesses.

FREDERICK JOSEPH ADFIELD,

Witnesses:
O. J. WORTH,
W. E. ROGERS.